United States Patent [19]

Kuan et al.

[11] 4,453,992

[45] Jun. 12, 1984

[54] METHOD OF MAKING A PNEUMATIC TIRE HAVING A LUBRICANT-CONTAINING POCKET INTEGRALLY FORMED THEREIN

[75] Inventors: Tiong H. Kuan, Stow; Joseph Pantuso, Springfield Township, Summet County; John G. Sommer, Hudson, all of Ohio

[73] Assignee: The General Tire & Rubber Company, Akron, Ohio

[21] Appl. No.: 270,959

[22] Filed: Jun. 8, 1981

Related U.S. Application Data

[60] Continuation-in-part of Ser. No. 176,747, Aug. 6, 1980, abandoned, which is a division of Ser. No. 33,341, Apr. 26, 1979, abandoned.

[51] Int. Cl.$^3$ .................... B60C 21/08; B60C 19/00; B29H 17/14; B32B 31/00
[52] U.S. Cl. .................... 156/115; 156/123; 156/145; 156/278; 156/289; 156/292; 152/330 L; 152/347; 152/429; 251/369; 251/DIG. 1; 137/223; 428/912
[58] Field of Search .................... 156/95–97, 156/110 R, 115, 123 R, 145, 278, 289, 292; 152/330 R, 330 RF, 330 L, 346–348, 429–430; 251/369, DIG. 1, 212; 137/223; 428/912

[56] References Cited

U.S. PATENT DOCUMENTS

| | | | |
|---|---|---|---|
| 2,343,838 | 3/1944 | Wilson | 156/115 |
| 3,118,672 | 1/1964 | Dorn | 137/223 |
| 3,496,969 | 2/1970 | Bruce et al. | 137/223 |
| 3,903,946 | 9/1975 | French et al. | 152/330 L |
| 3,930,528 | 1/1976 | Harrington | 152/330 L |
| 3,946,783 | 3/1976 | Edwards et al. | 152/330 RF |
| 4,054,168 | 10/1977 | Beers et al. | 152/330 L |
| 4,091,854 | 5/1978 | French et al. | 152/158 |
| 4,093,481 | 6/1978 | Schelkmann | 156/95 |
| 4,263,953 | 4/1981 | Miceli | 152/330 L |

FOREIGN PATENT DOCUMENTS 3004698  10/1980  Fed. Rep. of Germany .
 617664   2/1949  United Kingdom .

*Primary Examiner*—Lois E. Boland

[57] ABSTRACT

A pneumatic tire having a pocket filled with lubricant attached to the inner sidewall of the tire having a puncture sealant surrounded by an O-ring built into the inside wall of the pocket. The puncture sealant allows lubricant to be injected into the pocket by use of a syringe and eliminates the need for subsequent sealing of the pocket and leakage of lubricant from the pocket.

1 Claim, 2 Drawing Figures

METHOD OF MAKING A PNEUMATIC TIRE HAVING A LUBRICANT-CONTAINING POCKET INTEGRALLY FORMED THEREIN

This application is a continuation-in-part of application Ser. No. 176,747, filed Aug. 6, 1980, which in turn is a division of application Ser. No. 33,341, filed Apr. 26, 1979, both abandoned.

The invention relates to a pneumatic tire having a lubricant-containing pocket integrally formed therein.

The use of a lubricant-containing pocket formed in the sidewall of a tire makes it possible to run the tire after pressure is lost. The pocket is so positioned that when pressure is lost the pocket is ruptured and the lubricant enters the tire to prevent direct rubber-to-rubber contact. Rubber-to-rubber contact is undesirable as the friction is extremely high and upon prolonged running while flat, sufficient heat is generated to physically disintegrate the tire.

A run flat tire having a lubricant pocket formed in the sidewall is known in accordance of the prior art portion of claim 1, U.S. Pat. No. 3,930,528, Harrington (1976). The patent discloses how to form the pocket in the sidewall, where to position the pocket and the lubricants which can be placed in the pocket. The patent discloses that the lubricant can either be injected into the pocket or the pocket can be split and sachets of lubricant inserted into the pocket.

Inserting sachets of lubricant into pockets is tedious, time-consuming and expensive. Retaining the pockets in a sealed condition and injecting the lubricant into the sealant pockets is difficult because after injection the lubricant tends to come back out of the hole and the hole is difficult to seal.

The invention as claimed is intended to provide a remedy. It solves the problem of the lubricant leaking out of the injection hole and difficulty of sealing the smeared hole with lubricant. Advantages offered by the invention are namely that the problem of lubricant leaking and hole sealing are completely eliminated.

One way of carrying out the invention is described in detail below in which.

Figure 2:
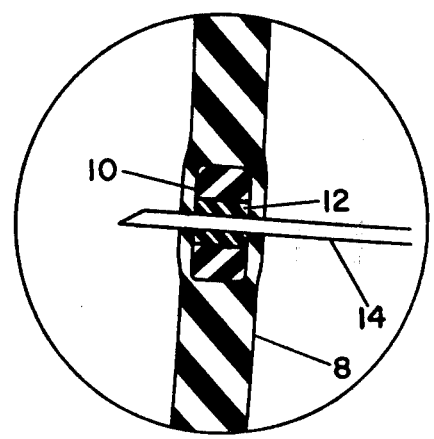
FIG. 2 is a magnified view of a valve used to inject lubricant into the pocket.
Figure 1:
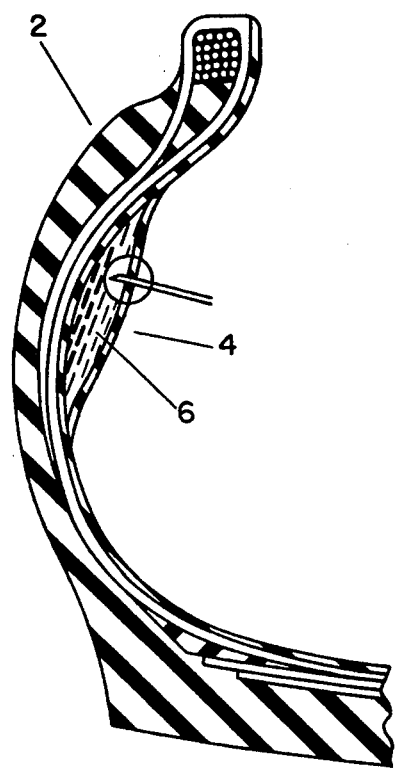
FIG. 1 is a cross-sectional view of a tire in accordance with the invention with a pocket 4 attached to the inner sidewall of the tire.

The figures show a tire 2 comprising in its basic design a pocket 4 formed in the sidewall of the tire with a lubricant 6 contained in the pocket and an outer pocket wall 8 forming a rupturable wall retaining the lubricant in the pocket. A rubber ring 10 for confining sealant 12 is attached to wall 8. The combination of wall 8, ring 10 and sealant 12 form a valve for injecting lubricant 6. In accordance with the invention, syringe needle 14 pierces sealant 12. Lubricant 6 is then injected through needle 14 until the pocket is filled.

Rubber ring 10 is an O-ring which is preferably at least partially cured and is used to confine sealant 12. The O-ring to be used is preferably elastomeric. The hole in the O-ring is preferably circular in form and has a diameter preferably from 2 to 5 mm. The thickness of the O-ring is preferably from 1 to 5 mm and the outside diameter of the O-ring is preferably from 4 to 15 mm.

Sealant 12 can be any conventional tire puncture sealant and preferably lies under the surface of wall 8. Wall 8 thus provides wiping the sealant from the needle when the needle is removed from the pocket. The specific sealant which was used has the following formulation: 60 parts of ethylene propylene non-conjugated diene rubber[1]; 40 parts of ethylene propylene ethylidene norbornene[2]; 120 parts of a high viscosity paraffinic oil[3]; 15 parts of Austin Black[4]; 2 parts of adiphenyl amine-acetone reaction product[5]; and 12 parts of a bromomethyl alkyl phenyl formaldehyde resin[6].

[1] Nordel 1070 available from duPont
[2] Epsyn 70 from Copolymer Rubber & Chemicals Co., Baton Rouge, LA. It is a zinc oxide-phenolic resin curable gum.
[3] Available as Sunpar 20-80 from the Sun Oil Company
[4] Austin Black is bituminous coal fines available from the Slab Fork Coal Co., and/or Columbia Carbon
[5] Available from Uniroyal Chemical, Naugatuck, Conn.
[6] SP1055 brominated phenolic available from Schenectady Chemicals The polymers are added first along with the carbon black to an internal mixer (Banbury mixer) then the oil was added in small increments during mixing.

The tire was built in a conventional manner except for the construction of the pocket and the incorporation of the valve into the pocket. The construction of the pocket is described in U.S. Pat. No. 3,930,528. The pocket was formed by painting two stripes of a release coating on the inner liner or applying strips of a releasing material between the inner liners to conform to the width and length of the pocket. An O-ring filled with the puncture sealant was then laid on a section of the inner liner coated with release agents. The opening on the bottom of the O-ring is covered with a thin gum strip such as a piece of inner liner. A second strip of inner liner, approximately 65 mm wide, was then laid over the release coat and extended beyond each side of the release coat by approximately 5 mm. The overlapped edges were stitched to the inner liner. The inner liner was then positioned on a building drum with the 65 mm wide strips directly in contact with the building drum. The tire was then built in a conventional manner.

After the tire was built and cured, from 250 to 500 grams of a run flat lubricant was injected through the valve into the pocket; no leakage or sealing problems occurred.

We claim:

1. A method of making a pneumatic tire comprising a carcass, a tread portion, two sidewall portions each terminating in a bead region, and at least one of said sidewall portions comprising two transversely spaced layers of material which define therebetween at least one integral pocket entirely within the tire structure, a lubricant composition in said pocket, the pocket being positioned in the tire in the region of a portion of the interior surface of the tire which contacts a second portion of the interior surface of the tire upon substantial underinflation or deflation of the tire during use thereof on a wheel such that the lubricant composition in said pocket is releasable therefrom onto the interior surface of the tire, said method comprising:

(a) positioning in a conventionally constructed tire carcass a gum strip covering one opening of an O-ring onto a band of release coating on an uncured tire inner liner, the O-ring having a hole in the center filled with a non-curable puncture sealant composition;

(b) covering the band of release coating and the inner liner adjacent the release coating with a strip of uncured rubber, wider than the band of release coating and curing the tire in a conventional manner; and (c) then injecting lubricant through the puncture sealant into the pocket.

* * * * *